(12) United States Patent
Richardson et al.

(10) Patent No.: US 8,037,369 B2
(45) Date of Patent: Oct. 11, 2011

(54) ERROR HANDLING STRUCTURE FOR USE IN A GRAPHICAL PROGRAM

(75) Inventors: Gregory C. Richardson, Round Rock, TX (US); John D. Stanhope, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 112 days.

(21) Appl. No.: 12/642,912

(22) Filed: Dec. 21, 2009

(65) Prior Publication Data

US 2011/0154094 A1    Jun. 23, 2011

(51) Int. Cl.
*G06F 11/00*    (2006.01)
(52) U.S. Cl. .......................... 714/57; 714/699
(58) Field of Classification Search .................... 714/57, 714/39, 45, 699, 38, 13
See application file for complete search history.

(56) References Cited

U.S. PATENT DOCUMENTS

| | | | |
|---|---|---|---|
| 5,301,336 A | 4/1994 | Kodosky et al. | |
| 5,651,108 A | 7/1997 | Cain et al. | |
| 5,760,788 A | 6/1998 | Chainini et al. | |
| 6,173,438 B1 | 1/2001 | Kodosky et al. | |
| 6,219,628 B1 | 4/2001 | Kodosky et al. | |
| 6,327,594 B1 | 12/2001 | Van Huben et al. | |
| 6,366,300 B1 | 4/2002 | Ohara et al. | |
| 6,425,120 B1 | 7/2002 | Morganelli et al. | |
| 6,425,121 B1 | 7/2002 | Phillips | |
| 6,578,174 B2 | 6/2003 | Zizzo | |
| 6,684,385 B1 | 1/2004 | Bailey et al. | |
| 6,701,513 B1 | 3/2004 | Bailey | |
| 7,559,032 B2 | 7/2009 | King et al. | |
| 2002/0091788 A1* | 7/2002 | Chlan et al. | 709/213 |
| 2002/0116708 A1* | 8/2002 | Morris et al. | 725/37 |
| 2002/0156757 A1 | 10/2002 | Brown | |
| 2003/0196136 A1* | 10/2003 | Haynes et al. | 714/13 |

OTHER PUBLICATIONS

"Simulink Using Simulink, Version 4," Nov. 2000, Front Page, Table of Contents, pp. 3-14-3-18, 5-26-5-29, 8-1-8-13, 9-261-9-262.
"Stateflow User's Guide, Version 4," Oct. 2001, Front Page, Table of Contents, Chapters 1-5.
Cox, Philip T. and Tomasz Pietrzykowski, "Visual Message Flow Language MFL and Its Interface," Advanced Visual Interfaces, 1992, pp. 348-361.

* cited by examiner

*Primary Examiner* — Dieu-Minh Le
(74) *Attorney, Agent, or Firm* — Meyertons Hood Kivlin Kowert & Goetzel, P.C; Jeffrey C. Hood; Mark S. Williams

(57) ABSTRACT

System and method for error handling in a graphical program. An error handling structure is displayed in a graphical program. The error handling structure includes a first frame configured to contain graphical program code for which error handling is to be provided. At least a portion of the graphical program is included in the first frame in response to user input specifying the at least a portion of the graphical program. During execution of the graphical program, the error handling structure aborts execution of the at least a portion of the graphical program in the first frame in response to detection of an unhandled error in the at least a portion of the graphical program in the first frame and continues execution of the graphical program.

23 Claims, 12 Drawing Sheets

--- display an error handling structure in a graphical program, where the error handling structure inlcudes a first frame configured to contain graphical program code for which error handling is to be provided
*502*

↓ include at least a portion of the graphical program in the first frame in response to user input specifying the at least a portion of the graphical program, where during execution of the graphical program, the error handling structure aborts execution of the at least a portion of the graphical program in the first frame in response to detection of an unhandled error in the at least a portion of the graphical program in the first frame and continues execution of the graphical program
*504* configured with program instructions according to embodiments of the invention computer system
82 display an error handling structure in a graphical program, where the error handling structure inlcudes a first frame configured to contain graphical program code for which error handling is to be provided
502 include at least a portion of the graphical program in the first frame in response to user input specifying the at least a portion of the graphical program, where during execution of the graphical program, the error handling structure aborts execution of the at least a portion of the graphical program in the first frame in response to detection of an unhandled error in the at least a portion of the graphical program in the first frame and continues execution of the graphical program
504

*FIG. 5*

ERROR HANDLING STRUCTURE FOR USE IN A GRAPHICAL PROGRAM

FIELD OF THE INVENTION

The present invention relates to the field of graphical programming, and more particularly to a system and method for error handling in a graphical program.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In prior art graphical programming, the user typically has two ways of handling errors during graphical program execution. They can abort the entire program hierarchy, or let the code continue running and have the code check if an error has happened. The first approach requires something outside the graphical program itself to recover and restart whatever the program was doing, e.g., a development or execution environment. The second approach may entail significant effort because each piece of code must check if an error has occurred and decide if it should continue executing or not, and so the program developer may be required to explicitly include error checking code throughout the graphical program.

Thus, improved systems and methods for error handling in graphical programs is desired.

SUMMARY OF THE INVENTION

Various embodiments of a system and method for error handling in a graphical program are presented below.

First, an error handling structure, specifically, a graphical error handling structure, may be displayed in a graphical program. The error handling structure may include a first frame configured to contain graphical program code for which error handling is to be provided. In some embodiments, the graphical program may be a graphical data flow program, and may be directed to any of a wide variety of functional domains, e.g., test and measurement, automation, control, simulation, analysis, and so forth, as desired. Thus, for example, the graphical program may be configured to perform one or more of: an industrial automation function, a process control function, or a test and measurement function, among others.

At least a portion of the graphical program may be included in the first frame in response to user input specifying the at least a portion of the graphical program. For example, in one embodiment, the user may select and "drag and drop" the at least a portion of the graphical program into the first frame, e.g., collectively, or one or more nodes at a time, e.g., from a palette, a graphical code library, another graphical program, etc. In other embodiments, the user may specify inclusion of the portion of the graphical program in the first frame via any means desired, e.g., via one or more menus, and so forth. Note that for brevity, the term "portion" may be used to refer to "at least a portion". In other words, a "portion" of a graphical program may refer to a subset, or all, of the graphical program.

During execution of the graphical program, the error handling structure may abort execution of the (at least a) portion of the graphical program in the first frame in response to detection of an unhandled error in the (at least a) portion of the graphical program in the first frame and may continue execution of the graphical program.

Thus various embodiments of the above described error handling structure may provide improved error handling functionality in graphical programs.

BRIEF DESCRIPTION OF THE DRAWINGS

A better understanding of the present invention can be obtained when the following detailed description of the preferred embodiment is considered in conjunction with the following drawings, in which:

FIG. 5 is a flowchart diagram illustrating one embodiment of a method for error handling in a graphical program;

Figure 1A:
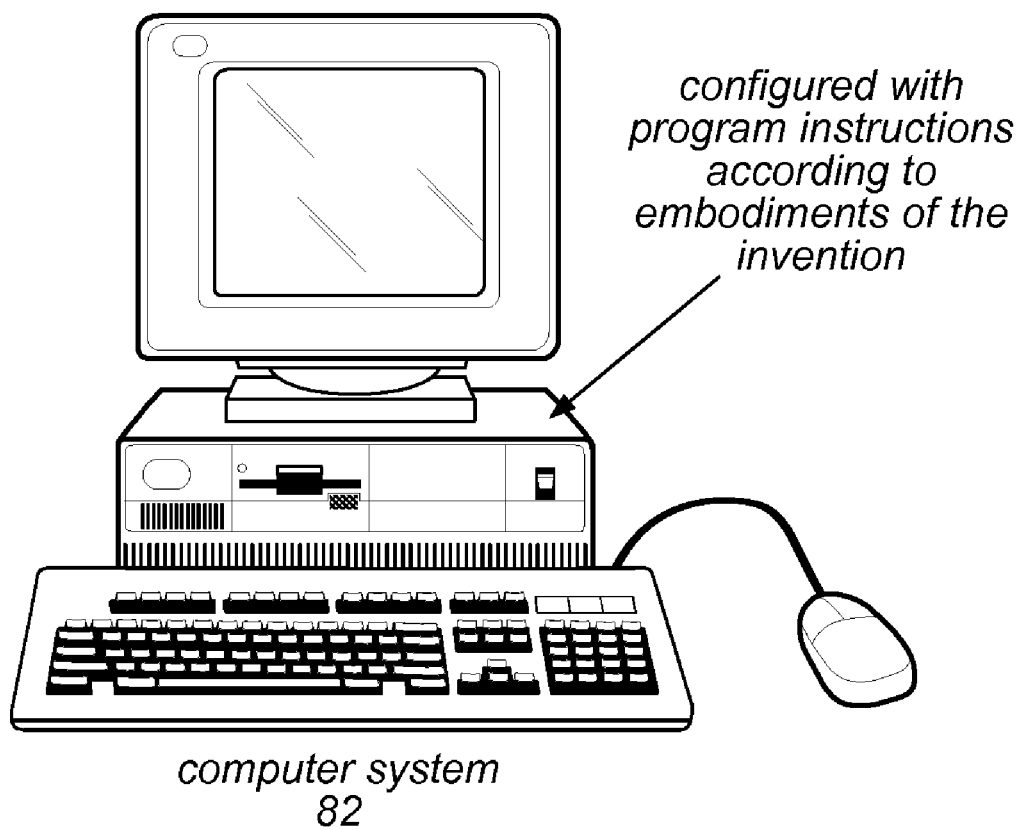
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1A—Computer System

FIG. 1A illustrates a computer system 82 configured to execute a graphical program configured to implement embodiments of the invention. One embodiment of a method for creating a graphical program configured with an error handling structure is described below.

As shown in FIG. 1A, the computer system 82 may include a display device configured to display the graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs, e.g., graphical programs, which are executable to implement or perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium. Thus, various embodiments of the invention may be implemented in software.

Figure 1B:
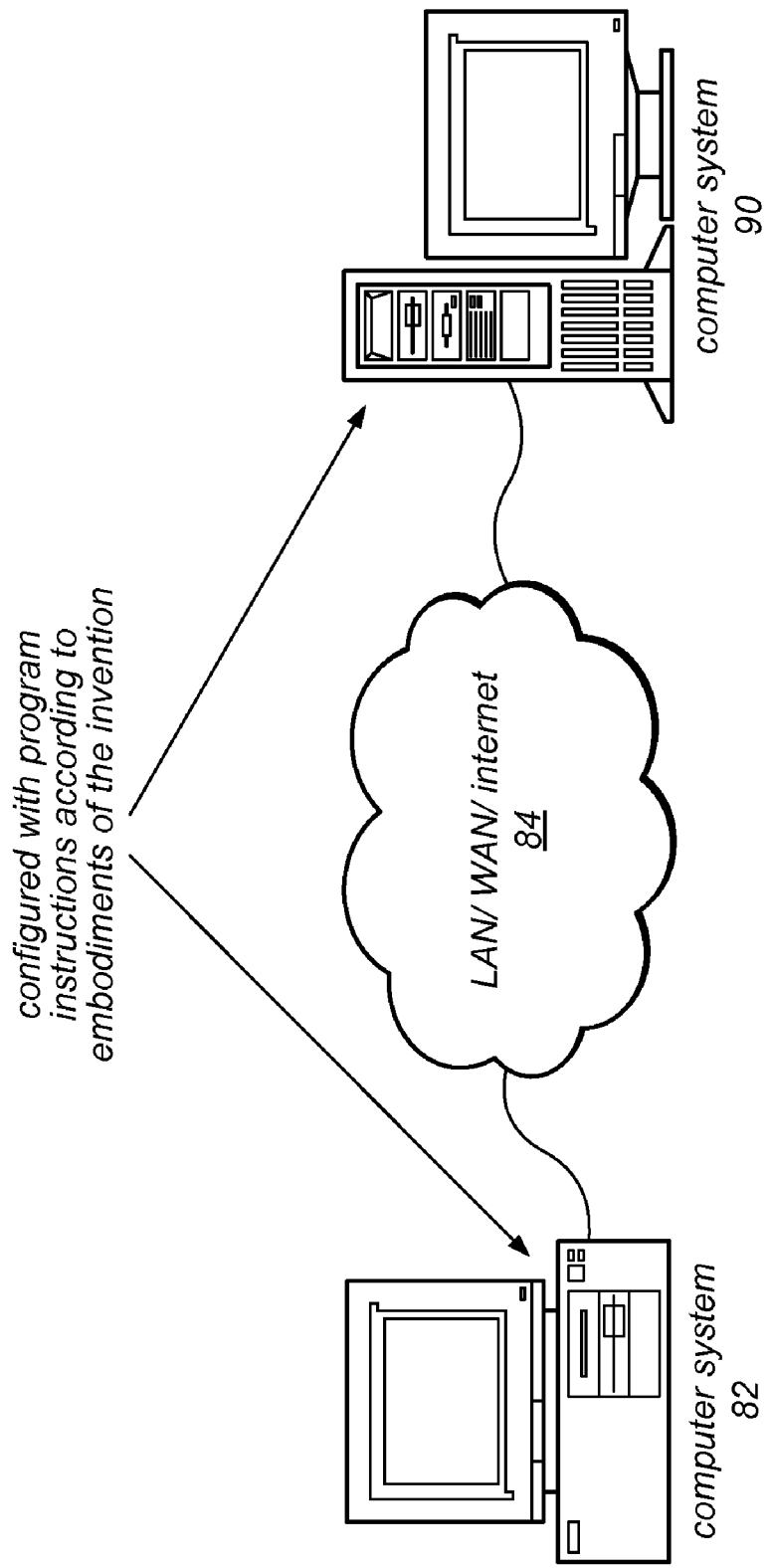
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
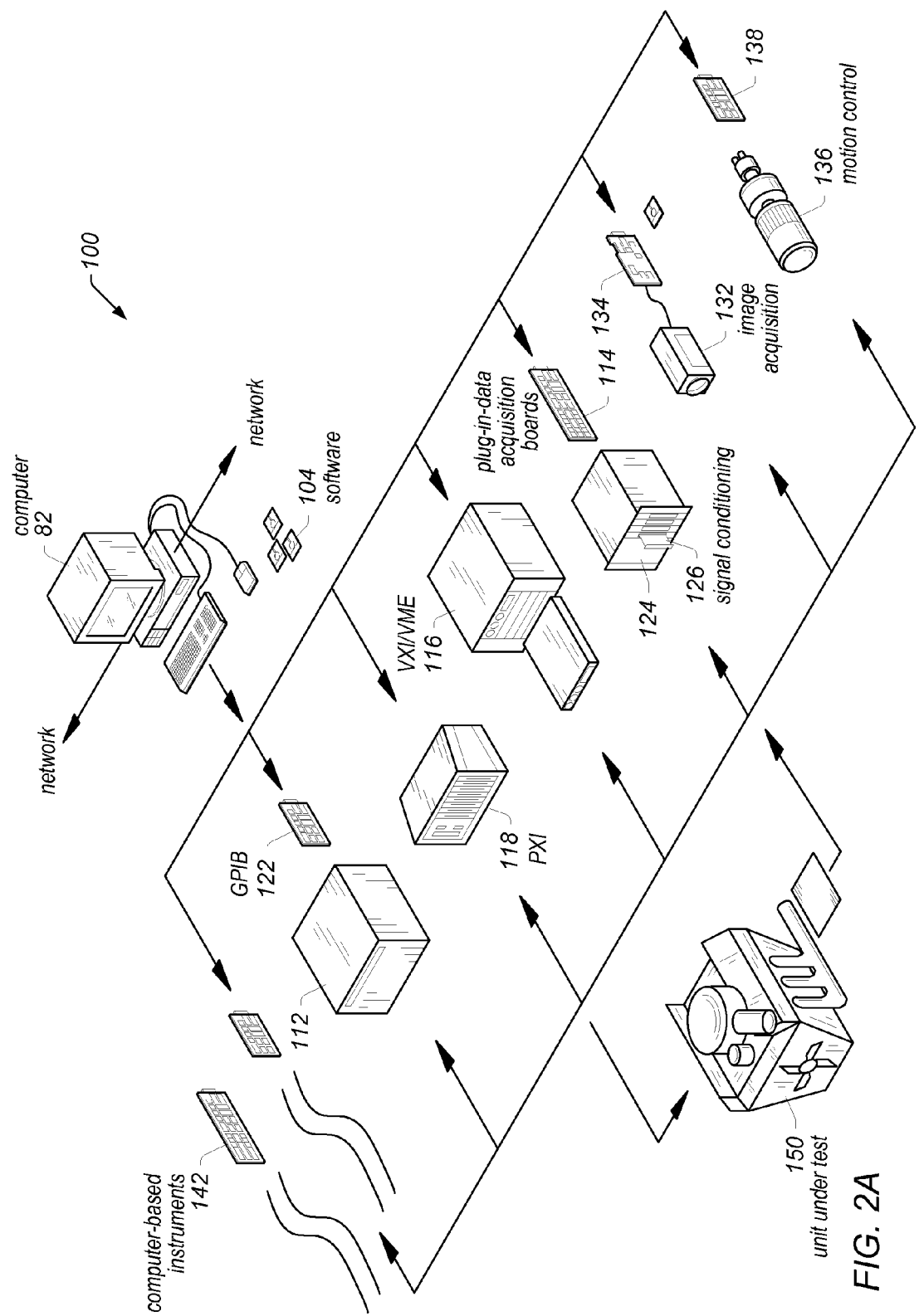
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
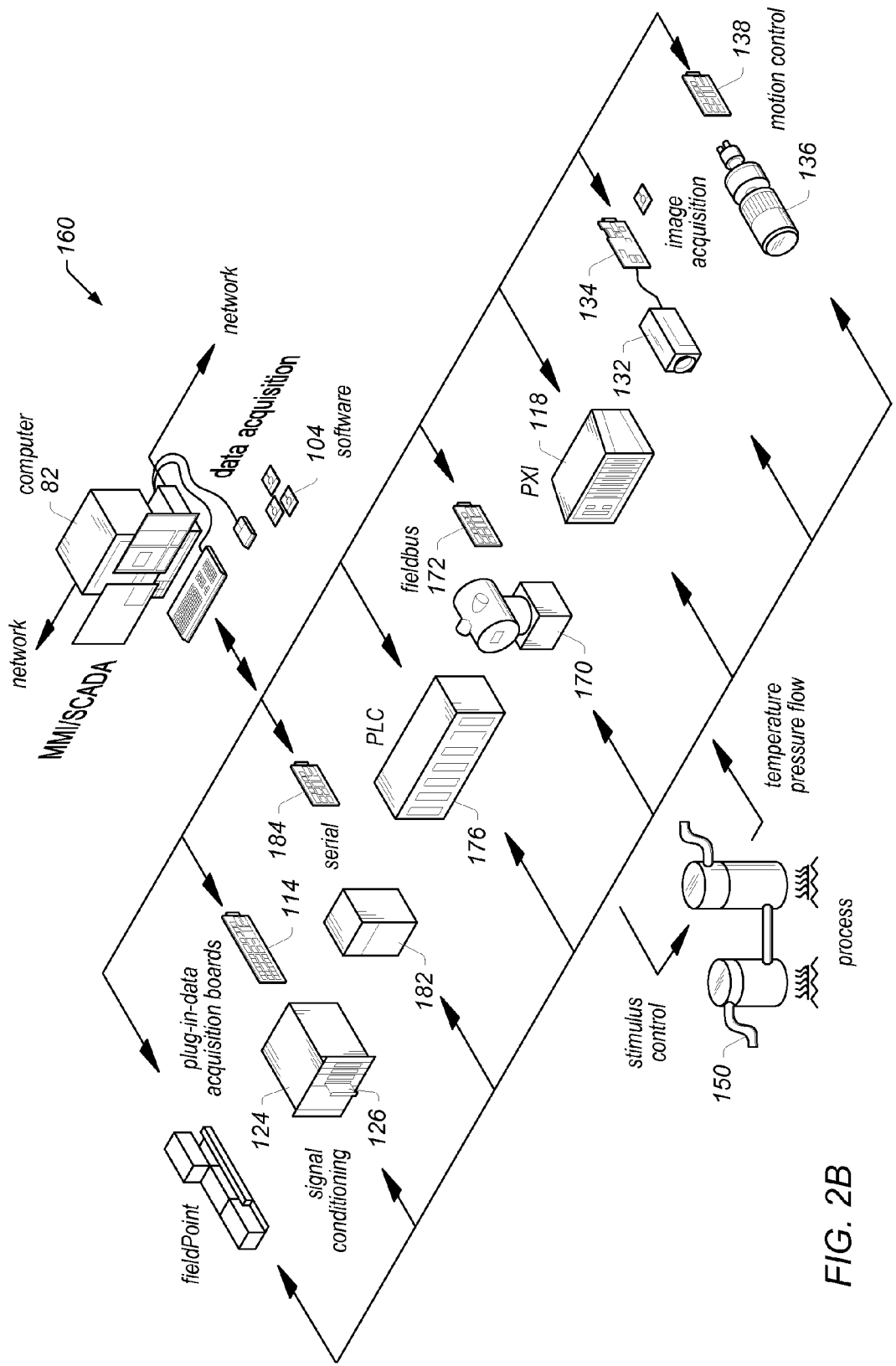
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
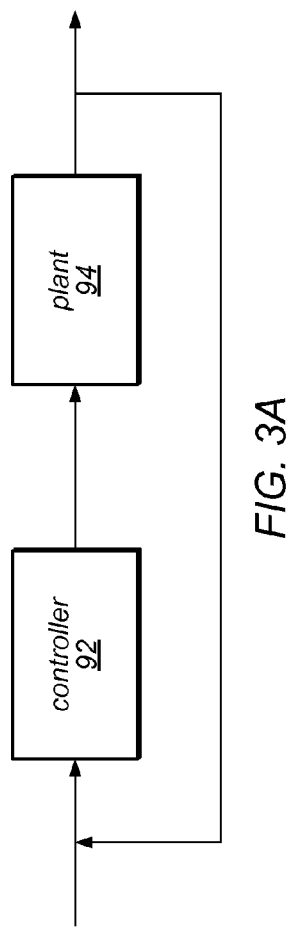
FIG. 3A is a high level block diagram of an exemplary system which may execute or utilize graphical programs.

FIG. 3A is a high level block diagram of an exemplary system which may execute or utilize graphical programs.

FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
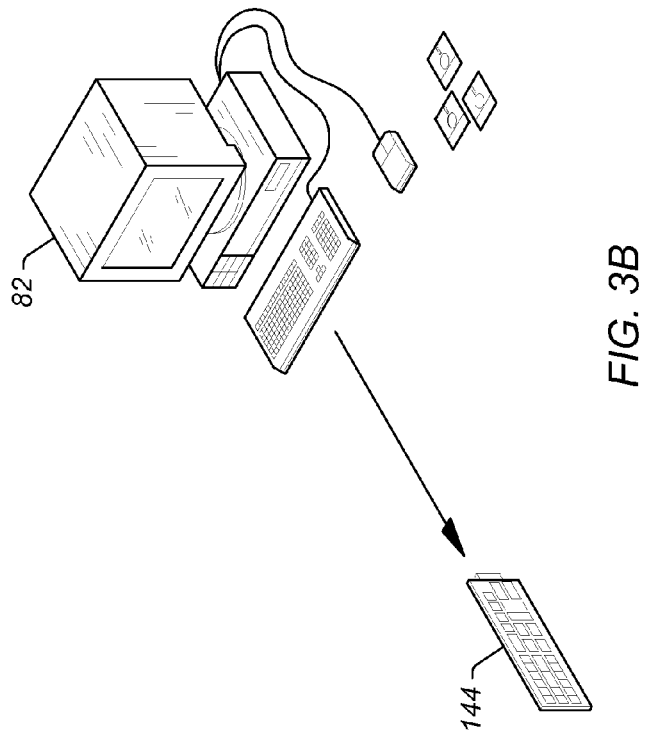
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
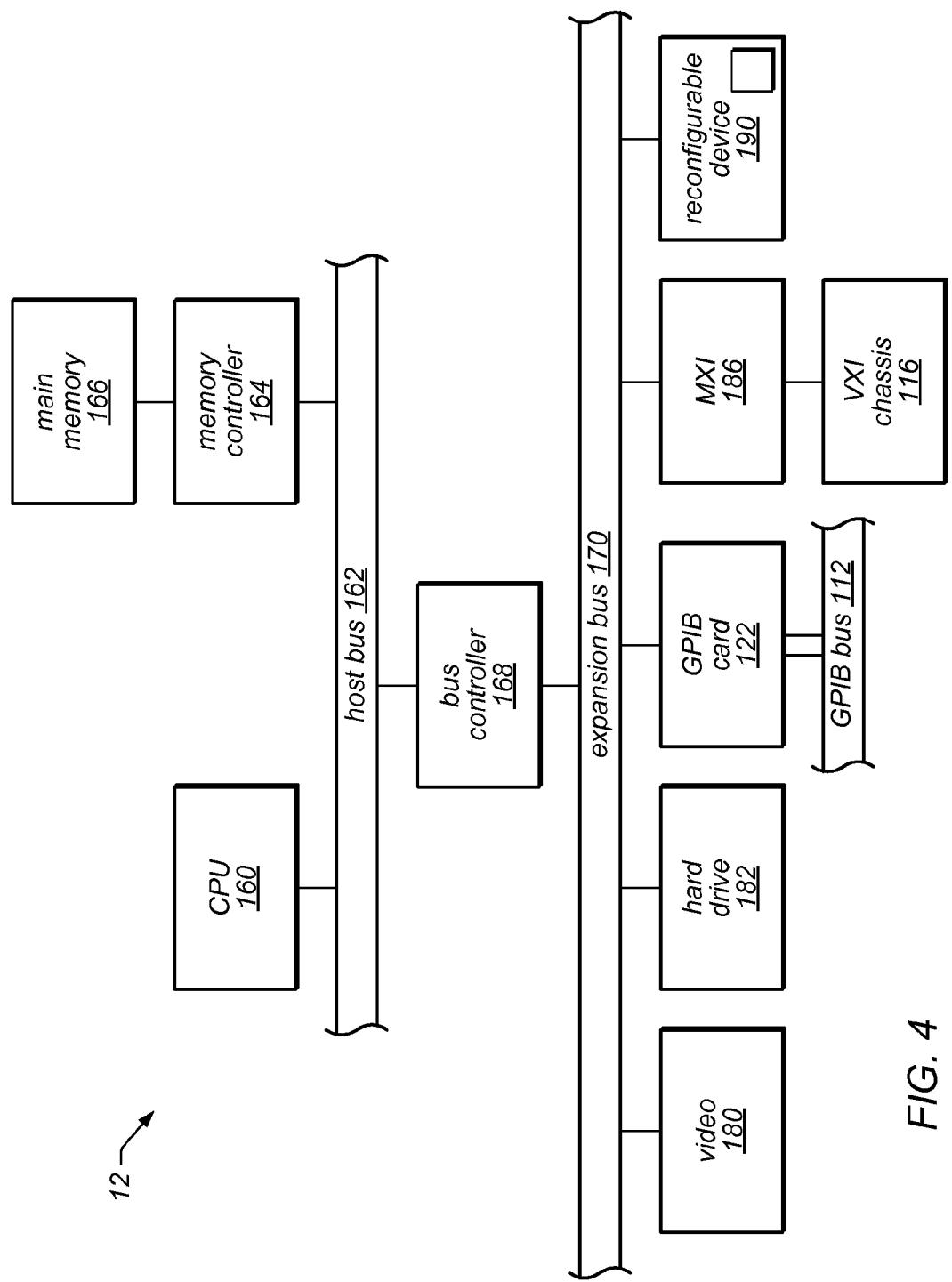
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program configured to include one or more error handling structures, as described herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Overview

Embodiments of the graphical error handling structure described herein may utilize a graphical frame-based approach to specify graphical program code for which the structure is to provide error handling functionality. In this manner, a user may easily specify the graphical program scope of the error handling, e.g., by including a portion of the graphical program code in a graphical frame of the structure, and in some embodiments, may specify the particular manner in which the error is handled for the specified code. For example if any error occurs in some network message passing code, a corresponding error handling structure (that contains this code) may include additional program code, possibly in one or more additional frames, that executes to close all of the program's network connections, open new connections, and try again.

More generally, in response to detecting an error in the relevant graphical program portion, the error handling structure may abort execution of the program portion, and exit that portion in a stable state. In other words, embodiments of the graphical error handling structure may provide a way to add error recovery code that does not require each piece of code in the program to check for errors. The error handling structure may assume that there are no previous errors in the contained portion of the graphical program because detection of an error aborts execution of that portion in a controlled manner. The error/abort may then be "caught" by program constructs higher in the program call stack. The catching code, e.g., error handling code, may then know that the error happened and may define what to do in response. It should be noted that in general, the errors described herein are "unhandled errors", in that they are errors that the graphical program code does not already explicitly handle, i.e., without recourse to the error handling structure disclosed herein.

FIG. 5—Flowchart of a Method for Error Handling in a Graphical Program

FIG. 5 illustrates a computer-implemented method for error handling in a graphical program, according to one embodiment. The method shown in FIG. 5 may be used in conjunction with any of the computer systems or devices shown in the above Figures, among other devices, and may be performed by one or more computers. In various embodiments, some of the method elements shown may be performed concurrently, in a different order than shown, or may be omitted. Additional method elements may also be performed as desired. As shown, this method may operate as follows.

First, in 502, an error handling structure, specifically, a graphical error handling structure, may be displayed in a graphical program. The error handling structure may be an icon displayed on a computer display, which may be placed in a graphical program displayed on the display. The error handling structure may include a first frame configured to contain graphical program code for which error handling is to be provided. As noted above, in some embodiments, the graphical program may be a graphical data flow program, and may be directed to any of a wide variety of functional domains, e.g., test and measurement, automation, control, simulation, analysis, and so forth, as desired. Thus, for example, the graphical program may be configured to perform one or more of: an industrial automation function, a process control function, or a test and measurement function, among others.

The graphical program may be created on the computer system 82 (or on a different computer system), and may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program. Graphical program developed under the LabVIEW graphical program development system may be referred to as virtual instruments (VIs).

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In 504, at least a portion of the graphical program may be included in the first frame in response to user input specifying the at least a portion of the graphical program. For example, in one embodiment, the user may select and "drag and drop" the at least a portion of the graphical program into the first frame, e.g., collectively, or one or more nodes at a time, e.g., from a palette, a graphical code library, another graphical program, etc. In other embodiments, the user may specify inclusion of the portion of the graphical program in the first frame via any means desired, e.g., via one or more menus, and so forth. Note that for brevity, the term "portion" may be used to refer to "at least a portion". In other words, a "portion" of a graphical program may refer to a subset, or all, of the graphical program.

During execution of the graphical program, the error handling structure may abort execution of the at least a portion of the graphical program in the first frame in response to detection of an unhandled error in the at least a portion of the graphical program in the first frame and may continue execution of the graphical program.

In various embodiments, the error handling structure may be implemented in any of a variety of ways, and may provide various levels of functionality, e.g., of different complexities.

For example, in one simple embodiment, the (at least a) portion of the graphical program may include one or more output parameters, and the error handling structure may include default values for the one or more output parameters. During execution of the graphical program, the error handling structure may specify output of the default values for the one or more output parameters in response to detection of the unhandled error in the portion of the graphical program in the first frame.

Figure 6:
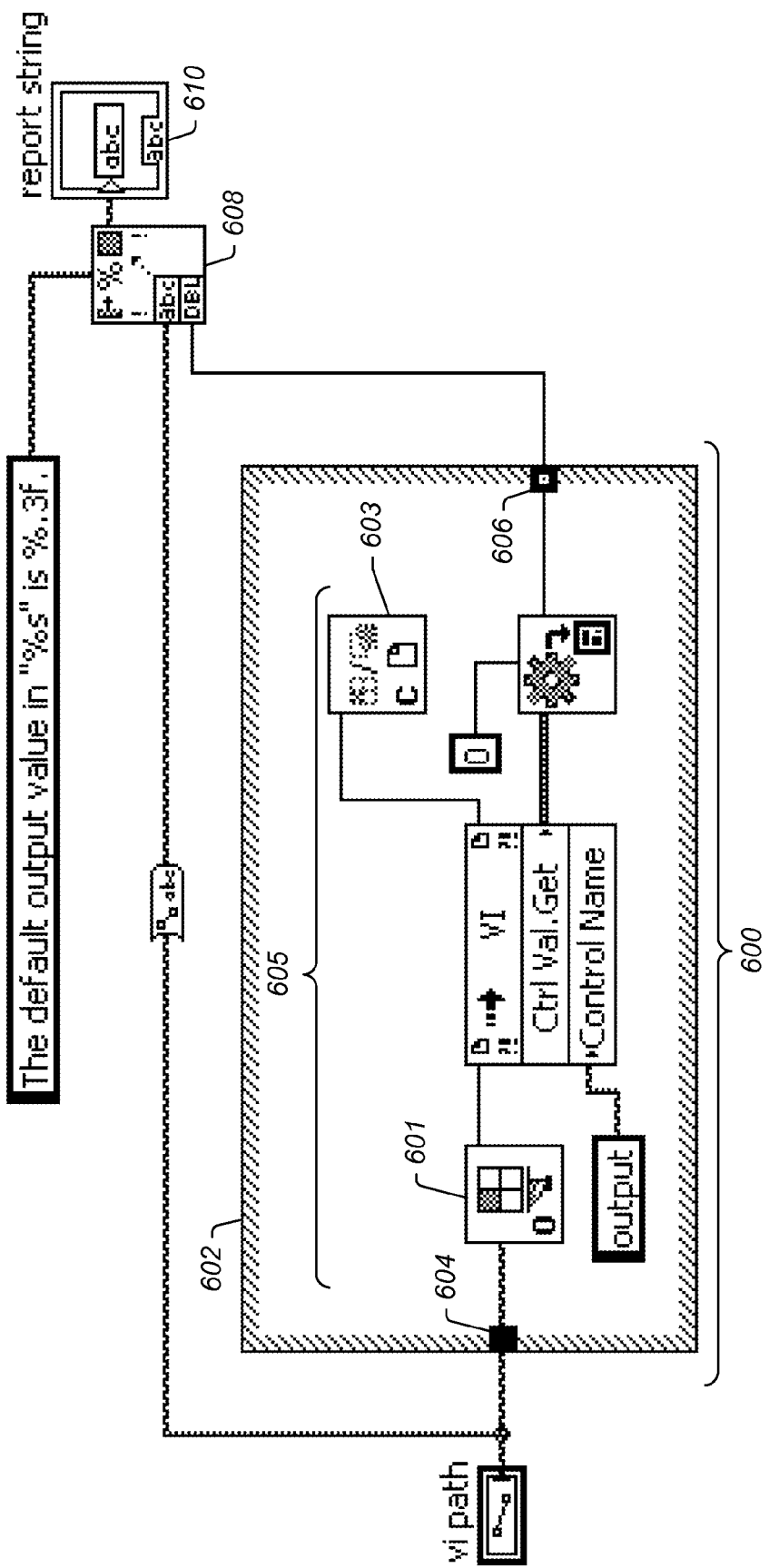
FIG. 6 illustrates an exemplary single frame error handling structure in a graphical program, according to one embodiment.

FIG. 6 illustrates a graphical program with an exemplary embodiment of an error handling structure 602 that includes such a first frame, which may also be referred to as a "normal" frame, in that the frame may include the portion of graphical program code specified to execute as part of the normal execution of the graphical program. In other words, this frame contains normal graphical program code, as opposed to graphical program code specifically directed to error handling. In this embodiment, the normal (i.e., first) frame is represented by a large hatched rectangle, and includes an input tunnel 604, and an output tunnel 606, whereby inputs and outputs may be passed into and out of the frame, respectively. As may be seen, the first frame contains graphical program code 605 that may be configured to execute when the error handling structure executes, including an "open VI reference" node 601, and a "close reference" node 603, which operate respectively to open and close a reference to a VI, i.e., a graphical program. Said a different way, during execution of the graphical program, the error handling structure may execute the graphical program code 605 contained in the first or normal frame. Expressed in a slightly different manner, during execution of the graphical program, the error handling structure may execute the first or normal frame, which includes executing the graphical program code contained therein.

As noted above, in this embodiment, the error handling structure includes default values for one or more output parameters of the graphical code portion (contained in the first frame) which may be output, e.g., via the output tunnel 606, in the event that an unhandled error is detected in the graphical code portion, which, as shown, are included in an alphanumeric string in a "format into string" node 608, and output by "report string" node 610. In this particular case, the default value is zero.

Thus, in the embodiment of FIG. 6, the error handling structure contains only the normal (or first) frame. If any unhandled error occurs in the contained code, all execution inside the structure (i.e., inside the first frame) may be stopped. If the node that is wired to the output tunnel 606 has not executed when the frame aborts, then the output tunnel may produce the default value(s) for output.

In some embodiments, the default values for the one or more output parameters may be set in response to user input. In other words, user input may be received specifying the one or more default values, and the error handling structure may be configured accordingly, thus setting the default values. In another embodiment, the default values for the one or more output parameters may be or include default values for respective data types. In other words, the default values may be generic to respective data types. Such default values may be referred to as "default default" values, and may not require specification by the user. In a further embodiment, such default default values may be overridden by user-specified default values as desired, either at the data type level, or at the individual parameter level.

In a slightly more complex embodiment, the error handling structure may include error handling code for handling unhandled errors that occur in the at least a portion of the graphical program. In other words, the error handling structure may provide functionality beyond simply providing default values. During execution of the graphical program, the error handling structure may specify execution of the error handling code in response to the detection of the unhandled error in the at least a portion of the graphical program in the first frame. In some embodiments, the method may include associating the error handling code with the error handling structure in response to user input specifying the error handling code. In other words, similar to the default values, in some embodiments, the user may specify error handling code for the error handling structure. This error handling code may be configured to execute upon detection of an unhandled error in the graphical program code portion contained in the first (normal) frame.

The graphical program may be executed, which may include executing the error handling structure. Executing the error handling structure may include executing the at least a portion of the graphical program contained in the first frame, and in response to detecting the unhandled error in the at least a portion of the graphical program during the execution of the at least a portion of the graphical program, execution of the at least a portion of the graphical program may be aborted or terminated, and the graphical error handling code may be executed to exit the at least a portion of the graphical program in a stable state. In other words, the execution of the portion of the graphical program contained in the first frame may be aborted, and the error handling code executed, possibly to provide output for use by graphical program code outside the error handling structure.

For example, in one embodiment, the at least a portion of the graphical program may be a first portion of the graphical program, and the graphical program may include a second portion that is not contained in the first frame. Aborting execution of the at least a portion of the graphical program may not terminate execution of the second portion of the graphical program. Thus, the error handling structure may terminate execution of the graphical code portion (within which the error occurred), execute the error handling code, and allow the graphical program to continue executing.

In some embodiments, the error handling code may be or include graphical error handling code. The error handling structure may include a second frame configured to contain the graphical error handling code, e.g., an "error handling" frame. The graphical error handling code may be included in the second frame in response to user input specifying the graphical error handling code. In other words, similar to the graphical program code in the first frame, the user may specify inclusion of the graphical error handling code in the second frame, e.g., by dragging and dropping graphical program nodes into the frame and interconnecting them by "wiring" the nodes together. Alternatively, the user may select a portion of graphical program code for inclusion, e.g., by selecting and dropping groups of possibly interconnected nodes into the frame.

Figure 7:
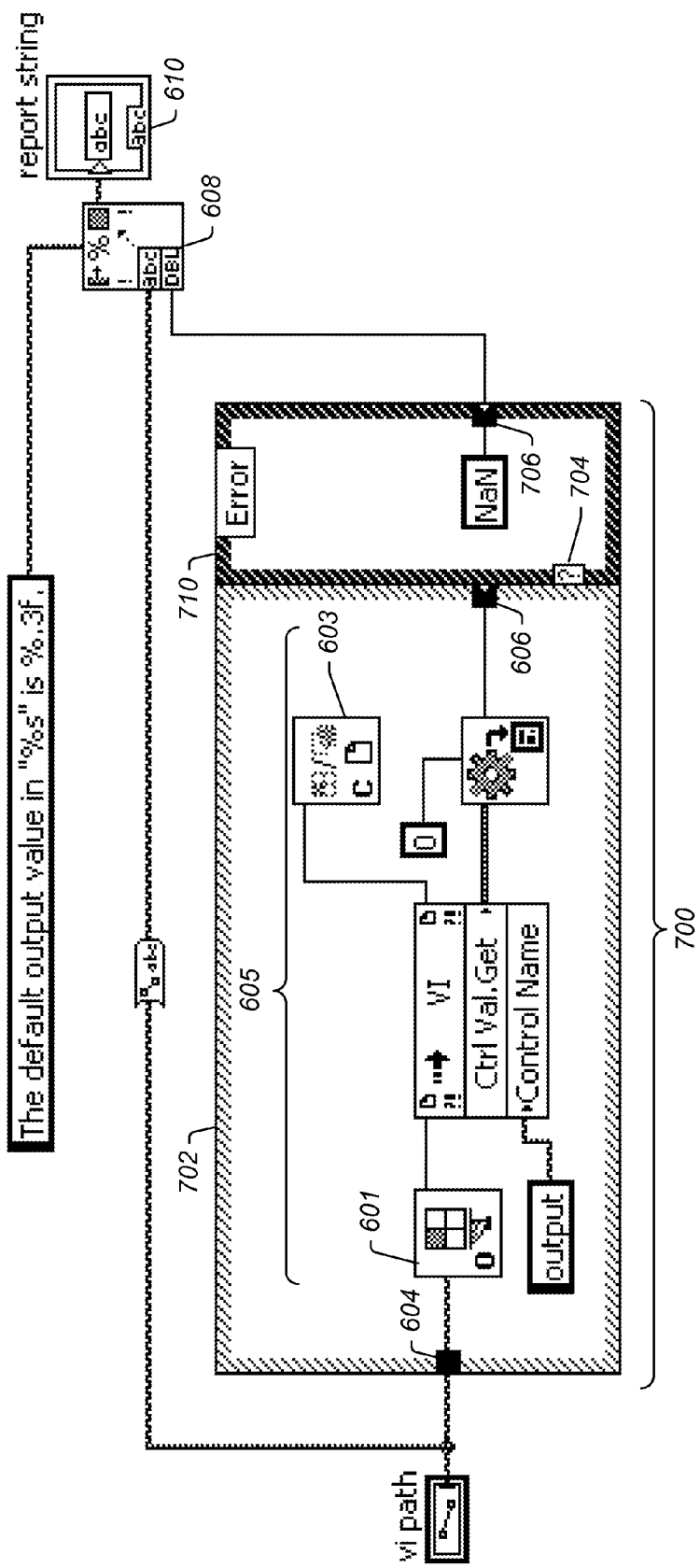
FIG. 7 illustrates an exemplary error handling structure that also includes an error handling frame, according to one embodiment.

FIG. 7 illustrates a graphical program with an exemplary embodiment of an error handling structure 700 that includes a first (e.g., normal) frame 702 containing the graphical program portion 605, as well as a second (e.g., error handling) frame, labeled "Error", that may contain graphical error handling code. Note that in this exemplary embodiment, the error handling frame simply provides default values for the graphical program portion contained in the first or normal frame, where the default values are provided in lieu of default default values, described above. In other words, the exemplary embodiment of FIG. 7 is directed to a case where default default values are not sufficient for error handling, and so the error handling structure includes the second (e.g., error handling) frame, possibly in response to user input, where the second frame may be executable to provide the default values in the event an error occurs within the first frame. Note that the second frame also includes an output tunnel 706 whereby the default output values may be output to the external graphical program nodes 608 and 610.

Note that in this exemplary embodiment, small (white) arrows on the tunnels indicate that they are linked. Thus, if the error frame is not executed, the value from the normal frame's tunnel 606 will exit the tunnel 706 on the error frame 710, but if the error frame is run (which means that an unhandled error has occurred), the value produced or provided by the code in the error frame 710 is used. Note that in this example, the default value provided by the error handling frame is NAN (not a number) rather than zero, as provided by the structure of FIG. 6. Moreover, in this example, the error frame 710 also includes a tunnel 704 (indicated by a question mark) to receive the error that was unhandled, which may be used in the error frame or wired out of the structure through another tunnel, as desired. It should be noted that in other embodiments, the error frame 710 may include any graphical program code as desired to handle the error.

In a further embodiment, the error handling structure may include a "finally" frame configured to contain graphical finally code, where "finally code" refers to code that is specified to execute whether or not an error occurs. In other words, during execution of the graphical program, the error handling structure may specify execution of the finally code regardless of whether or not an unhandled error in the at least a portion of the graphical program in the first frame occurs. For example, the finally frame may allow the user to include "cleanup code" in the graphical program (or, more specifically, in the error handling structure) that always executes but does not treat the error, if one occurs, as handled. The graphical finally code may be included in the finally frame in response to user input specifying the graphical finally code, e.g., by dragging and dropping the graphical code into the finally frame, via menus, etc., as desired.

Figure 8:
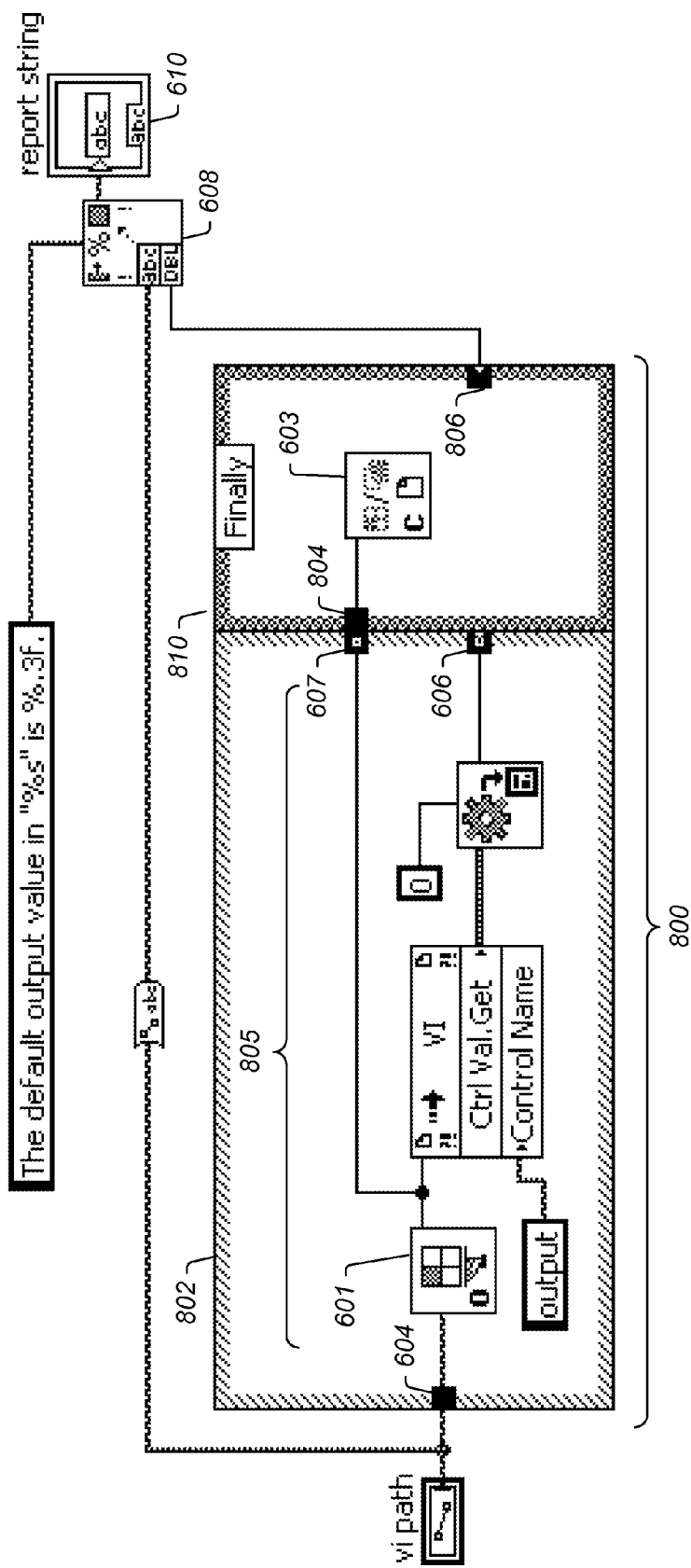
FIG. 8 illustrates an exemplary error handling structure that also includes a finally frame, according to one embodiment.

FIG. 8 illustrates a graphical program with an exemplary error handling structure 800 that includes a first (e.g., normal) frame 802 containing a graphical program portion 805, as well as a finally frame 810, labeled "Finally", that may contain finally code that, as described above, executes whenever the error handling structure executes, regardless of whether or not an error occurs in the graphical program portion. More specifically, in the exemplary embodiment of FIG. 8, the finally code provides "cleanup" functionality in the form of the "close reference" node 603, which executes to close the reference to a VI that was opened by "open VI reference" node 601, and which was moved from the first or normal frame to the finally frame. In other words, this finally code (the close reference node 811) addresses an issue that could arise in the earlier examples of FIG. 6 and FIG. 7 where the VI reference is opened, but due to aborting execution of the graphical program portion in the normal frame (in response to an unhandled error), the "close reference" node is not called, thus leaving the VI reference open (i.e., dangling). The finally code in the finally frame will thus execute the close reference whether an error occurs or not. As also shown, in this embodiment, the finally frame 810 also includes an input tunnel 804 and an output tunnel 806 for receiving input and providing output, respectively.

In one embodiment, in specifying execution of the finally code, the error handling structure may further specify retriggering of the unhandled error in response to the detection of the unhandled error in the at least a portion of the graphical program in the first frame. For example, the error handling structure may itself be included in a first frame of a second error handling structure in the graphical program, and during execution of the graphical program, retriggering of the unhandled error may result in detection of the unhandled error in the first frame of the second error handling structure in the graphical program. In other words, after "handling" the unhandled error generated in the graphical program portion in the first or normal frame, after aborting execution of that code portion and exiting the code gracefully, i.e., in a stable state, the error handling structure (e.g., the finally frame) may retrigger the unhandled error, thereby passing it up to any calling code in the program hierarchy, in case further cleanup or error handling is required.

Thus, in some embodiments, if an error does occur, then after execution of the finally code (which in this particular case, closes the reference), the error may be retriggered. In this example, the "format into string" node may not execute, but rather, the VI may "abort up" to any error handling structure in its callers. Thus, for example, in some embodiments, the graphical program hierarchy may include nested error handling structures, where any unhandled error that occurs in an error handling structure may be handled locally by that structure, then retriggered for possible handling by one or more error handling structures above it in the calling hierarchy. Each error handling structure higher in the hierarchy may thus have an opportunity to react to the unhandled error, and may then retrigger the error for any error handling structure above it. Thus, the unhandled error may "bubble up" through the nested error handling structures, while being "handled" locally at each level.

It should be noted that in various embodiments, the various frames described above may be combined as desired. Additionally, the inclusion of error and/or finally frames in the error handling structure may be specified by the user, specified by configuration information, e.g., a configuration file or data structure, or may be inherent. For example, each of a plurality of versions of the error handling structure may be selectable for use by the user, e.g., from a palette or menu.

Figure 9:
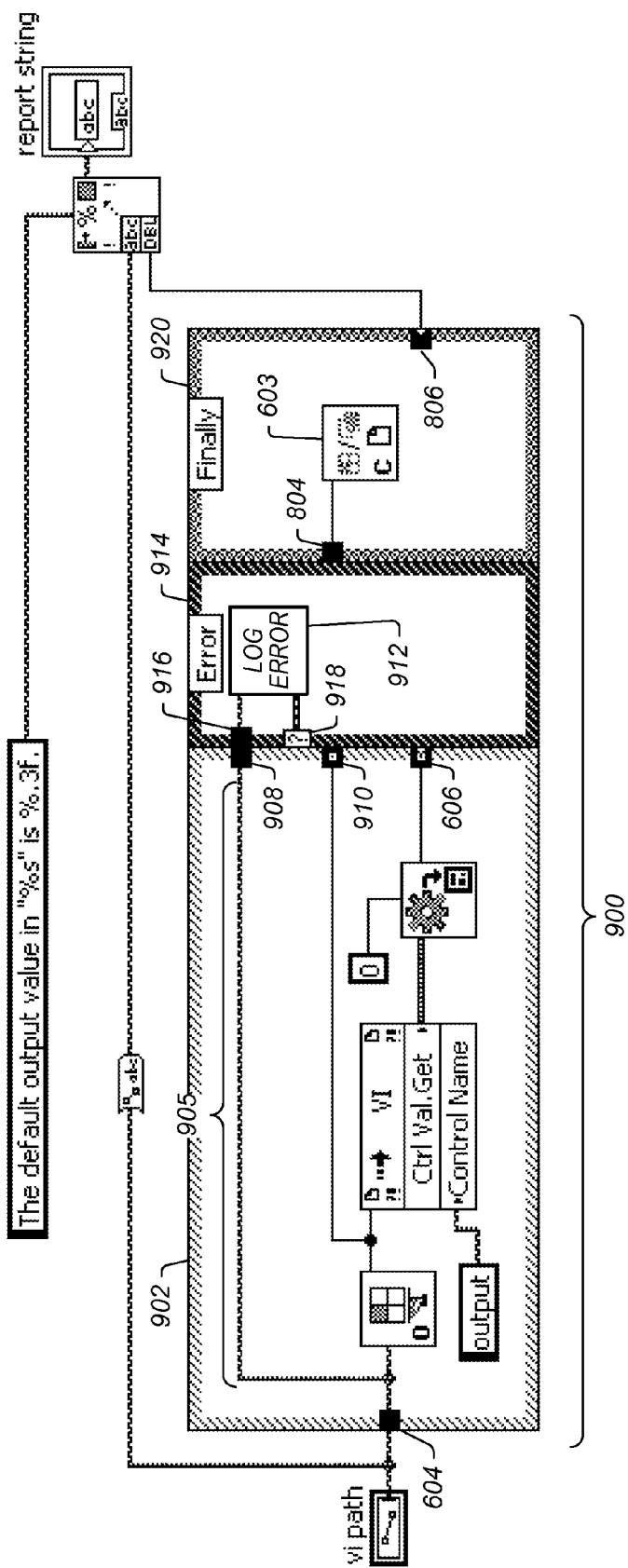
FIG. 9 illustrates an exemplary error handling structure that also includes an error handling frame and a finally frame, according to one embodiment.

FIG. 9 illustrates a graphical program with an exemplary error handling structure that includes a normal or first frame 902 that contains at least a portion of a graphical program 905, an error (e.g., second) frame 914 that includes an error logging node 912, and a finally frame 920 that includes the close reference node 603. Note that each frame includes respective tunnels for inter- and intra-frame communications. For example, as may be seen, the normal frame 902 includes three output tunnels: tunnel 908, which may provide data received by the normal frame input tunnel 604, tunnel 910, which may provide the opened VI reference, and tunnel 606, which may provide program output from the graphical program portion contained in the first or normal frame. Similarly, error frame 914 includes an input tunnel 916 for providing data received from the normal frame through tunnel 908, and providing this information to the error logging node 912, as well as a tunnel 918 for receiving error information regarding the unhandled error and providing this information to the error logging node 912. As may also be seen, the finally frame includes input tunnel 804 that may provide finally frame input to the close reference node 603, as well as output tunnel 806 for providing output to program code external to the error handling structure.

In this exemplary embodiment, the error frame may be executable to log the error, should one occur, via the error logging node 912 contained therein. The finally frame 920 will execute whenever the error handling structure executes, and thus guarantees that the reference is closed, whether or not an error occurs. Moreover, as described above regarding the finally frame of FIG. 8, via execution of the finally frame, if an error occurs, the error is treated as unhandled at the end of the structure, e.g., for further processing by calling code.

Note that in the embodiments described above, the frames are arranged and displayed in sequence; however, in other embodiments, the frames may be arranged and/or displayed differently.

Figure 10:
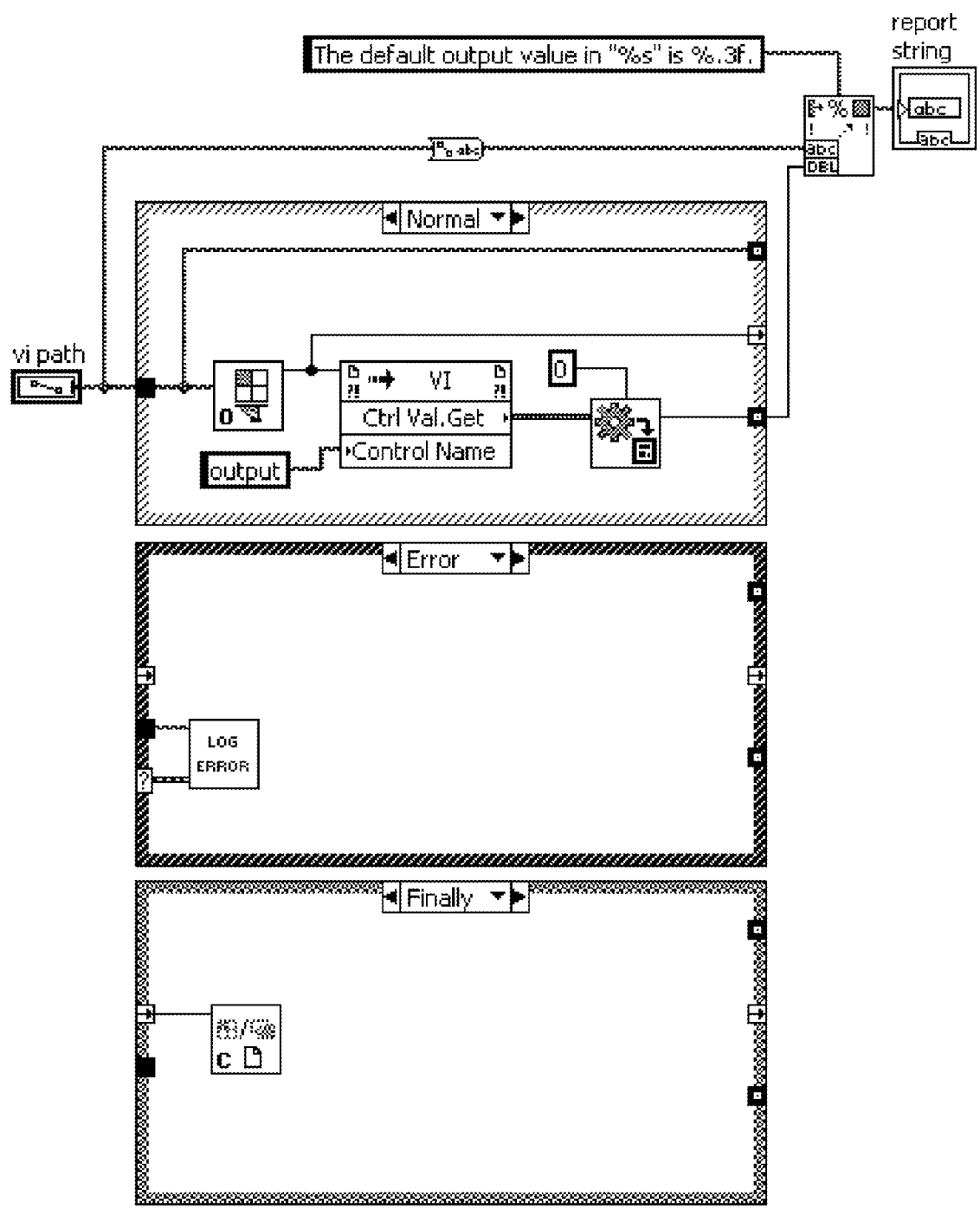
FIG. 10 illustrates the exemplary error handling structure of FIG. 9, but with frames displayed in stacked fashion, according to one embodiment.

FIG. 10 illustrates a stacked visual representation of the graphical program of FIG. 9. As shown, in this embodiment, the normal frame (labeled "Normal") is presented in context with its surrounding graphical program (block diagram), and the error and finally frames, so labeled, are presented below.

In one embodiment, the frames may be stacked such that only one frame is viewable at a time. For example, the normal frame may by default be displayed "on top", and any other frames may be selected for viewing by the user, e.g., via selectable tabs, or any other means desired. Thus, each of the frames may have the same location, with the top frame occluding those below it in the stack. This visual representation may make the behavior of tunnels most clear to the user. For example, in embodiments of this form, input tunnels may be read from any frame, and output tunnels may be required to be specified in each frame (or configured to use default settings if unwired). If an error occurs, the output values may thus be provided from the error frame; otherwise the values from the normal frame (and/or the finally frame, if used) may be used.

In another exemplary embodiment, the frames may displayed in a manner similar to the layout of FIG. 10, e.g., where the frames are arranged in parallel. Note, however, that in other embodiments, the frames may be arranged and displayed in any manner desired. Moreover, in some embodiments, tunnel indicators may be modified or visually designed to explicate their I/O relationships, e.g., via labels, colors, symbols, connecting wires, etc., as desired.

Thus, summarizing the above, in various embodiments, the error handling structure may be implemented as a single frame structure, or as a multiple frame structure, where, as described above, a first frame, e.g., the normal frame, may include the "normal code" that the user intends for execution, subject to error handling, and one or more other frames for providing error handling and/or finally functionality. If an unhandled error happens anywhere in the code contained in the normal frame, all the code running inside the normal frame may be aborted and the error frame may be executed, possibly along with any finally code in a finally frame. Assuming no further errors occur, execution may then continue with any code outside the error handling structure.

Note that in embodiments where parallelism is supported in the graphical program, e.g., in embodiments where the graphical program is a graphical data flow program, there may be multiple independent pieces or portions of code executing inside the structure, e.g., within the normal frame. An error that occurs in any one of these pieces may abort not only the piece of code in which it occurs, but all the others as well. However, any code that was running in parallel outside the error handling structure may be allowed to continue executing. Thus, it may be necessary to track which pieces of code are running in or under each error handling structure in a graphical program. Thus, the user should be cognizant of the fact that an error in one piece of code can cause some other piece of code executing within or under the same error handling structure to stop at an arbitrary location.

Thus various embodiments of the above described error handling structure may provide improved error handling functionality in graphical programs.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-accessible memory medium that stores program instructions executable by a processor to implement:
    displaying an error handling structure in a graphical program, wherein the graphical program comprises a plurality of interconnected nodes that visually indicate functionality of the graphical program, and wherein the error handling structure comprises a first frame configured to contain graphical program code for which error handling is to be provided; and
    including at least a portion of the graphical program in the first frame in response to user input specifying the at least a portion of the graphical program;
    wherein during execution of the graphical program, the error handling structure aborts execution of the at least a portion of the graphical program in the first frame in response to detection of an unhandled error in the at least a portion of the graphical program in the first frame and continues execution of the graphical program.

2. The computer-accessible memory medium of claim 1, wherein the at least a portion of the graphical program includes one or more output parameters;
    wherein the error handling structure comprises default values for the one or more output parameters; and
    wherein during execution of the graphical program, the error handling structure specifies output of the default values for the one or more output parameters in response to detection of the unhandled error in the at least a portion of the graphical program in the first frame.

3. The computer-accessible memory medium of claim 2, wherein the program instructions are further executable to implement:
    setting the default values for the one or more output parameters in response to user input specifying the one or more default values.

4. The computer-accessible memory medium of claim 2, wherein the default values for the one or more output parameters comprise default values for respective data types.

5. The computer-accessible memory medium of claim 1,
    wherein the error handling structure comprises error handling code for handling unhandled errors that occur in the at least a portion of the graphical program; and
    wherein during execution of the graphical program, the error handling structure specifies execution of the error handling code in response to the detection of the unhandled error in the at least a portion of the graphical program in the first frame.

6. The computer-accessible memory medium of claim 5, wherein the program instructions are further executable to perform:
    associating the error handling code with the error handling structure in response to user input specifying the error handling code.

7. The computer-accessible memory medium of claim 5, wherein the program instructions are further executable to implement:
    executing the graphical program, including executing the error handling structure, wherein said executing the error handling structure comprises:
        executing the at least a portion of the graphical program contained in the first frame;
        in response to detecting the unhandled error in the at least a portion of the graphical program during said executing the at least a portion of the graphical program:
            aborting execution of the at least a portion of the graphical program; and
            executing the graphical error handling code to exit the at least a portion of the graphical program in a stable state.

8. The computer-accessible memory medium of claim 7, wherein the at least a portion of the graphical program is a first portion of the graphical program, where the graphical program includes a second portion that is not contained in the first frame, and wherein said aborting execution of the at least a portion of the graphical program does not terminate execution of the second portion of the graphical program.

9. The computer-accessible memory medium of claim 5,
    wherein the error handling code comprises graphical error handling code;
    wherein the error handling structure comprises a second frame configured to contain the graphical error handling code;
    wherein the program instructions are further executable to implement:
        including the graphical error handling code in the second frame in response to user input specifying the graphical error handling code.

10. The computer-accessible memory medium of claim 9, wherein the error handling structure comprises a finally frame configured to contain graphical finally code; and wherein during execution of the graphical program, the error handling structure specifies execution of the finally code regardless of whether or not an unhandled error in the at least a portion of the graphical program in the first frame occurs.

11. The computer-accessible memory medium of claim 1, wherein the error handling structure comprises a finally frame configured to contain graphical finally code; and wherein during execution of the graphical program, the error handling structure specifies execution of the finally code regardless of whether or not an unhandled error in the at least a portion of the graphical program in the first frame occurs.

12. The computer-accessible memory medium of claim 11, wherein the program instructions are further executable to implement:
  including the graphical finally code in the finally frame in response to user input specifying the graphical finally code.

13. The computer-accessible memory medium of claim 11, wherein specifying execution of the finally code further comprises specifying retriggering of the unhandled error in response to the detection of the unhandled error in the at least a portion of the graphical program in the first frame.

14. The computer-accessible memory medium of claim 11, wherein the error handling structure is comprised in a first frame of a second error handling structure in the graphical program;
wherein during execution of the graphical program, said retriggering of the unhandled error results in detection of the unhandled error in the first frame of the second error handling structure in the graphical program.

15. The computer-accessible memory medium of claim 1, wherein the graphical program comprises a graphical data flow program.

16. The computer-accessible memory medium of claim 1, wherein the graphical program is configured to perform one or more of:
  an industrial automation function;
  a process control function;
  a test and measurement function.

17. A computer-implemented method, comprising:
utilizing a computer to perform:
  displaying an error handling structure in a graphical program, wherein the graphical program comprises a plurality of interconnected nodes that visually indicate functionality of the graphical program, and wherein the error handling structure comprises a first frame configured to contain graphical program code for which error handling is to be provided; and
  including at least a portion of the graphical program in the first frame in response to user input specifying the at least a portion of the graphical program;
  wherein during execution of the graphical program, the error handling structure aborts execution of the at least a portion of the graphical program in the first frame in response to detection of an unhandled error in the at least a portion of the graphical program in the first frame and continues execution of the graphical program.

18. The computer-implemented method of claim 17, wherein the at least a portion of the graphical program includes one or more output parameters;
wherein the error handling structure comprises default values for the one or more output parameters; and
wherein during execution of the graphical program, the error handling structure specifies output of the default values for the one or more output parameters in response to detection of the unhandled error in the at least a portion of the graphical program in the first frame.

19. The computer-implemented method of claim 17, wherein the error handling structure comprises error handling code for handling unhandled errors that occur in the at least a portion of the graphical program; and
wherein during execution of the graphical program, the error handling structure specifies execution of the error handling code in response to the detection of the unhandled error in the at least a portion of the graphical program in the first frame.

20. The computer-implemented method of claim 19, further comprising:
utilizing the computer to perform:
  executing the graphical program, including executing the error handling structure, wherein said executing the error handling structure comprises:
    executing the at least a portion of the graphical program contained in the first frame;
    in response to detecting the unhandled error in the at least a portion of the graphical program during said executing the at least a portion of the graphical program:
      aborting execution of the at least a portion of the graphical program; and
      executing the graphical error handling code to exit the at least a portion of the graphical program in a stable state.

21. The computer-implemented method of claim 20, wherein the at least a portion of the graphical program is a first portion of the graphical program, where the graphical program includes a second portion that is not contained in the first frame, and wherein said aborting execution of the at least a portion of the graphical program does not terminate execution of the second portion of the graphical program.

22. The computer-implemented method of claim 17, wherein the error handling structure comprises a finally frame configured to contain graphical finally code; and
wherein during execution of the graphical program, the error handling structure specifies execution of the finally code regardless of whether or not an unhandled error in the at least a portion of the graphical program in the first frame occurs.

23. The computer-implemented method of claim 22, wherein specifying execution of the finally code further comprises specifying retriggering of the unhandled error in response to the detection of the unhandled error in the at least a portion of the graphical program in the first frame.

* * * * *